(12) United States Patent
Wright

(10) Patent No.: US 6,543,000 B1
(45) Date of Patent: Apr. 1, 2003

(54) INTERRUPT MANAGEMENT SYSTEM WITH TIMERS AND CONTROLLER ABLE TO DETECT THE INTERRUPT MISSED AND GENERATE APPROPRIATE WARNING SIGNAL FOR ERROR HANDLING

(75) Inventor: Stephen Wright, Redland Bristol (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 09/444,678

(22) Filed: Nov. 22, 1999

(30) Foreign Application Priority Data

Dec. 17, 1998 (GB) .............................................. 9827825

(51) Int. Cl.$^7$ ................................................ G06F 1/14
(52) U.S. Cl. ...................... 713/500; 709/318; 710/260; 710/261; 710/262; 710/263
(58) Field of Search ................................ 710/260–264; 713/500; 709/318

(56) References Cited

U.S. PATENT DOCUMENTS

| | | | | |
|---|---|---|---|---|
| 4,538,235 A | | 8/1985 | Henning ..................... | 364/569 |
| 5,535,380 A | * | 7/1996 | Bergkvist, Jr. et al. ..... | 395/550 |
| 5,708,814 A | * | 1/1998 | Short et al. ................. | 395/733 |
| 5,768,620 A | | 6/1998 | Johnson et al. ............. | 395/835 |
| 5,797,037 A | * | 8/1998 | Ecclesine .................... | 395/868 |
| 5,931,936 A | * | 8/1999 | Chung et al. ............... | 710/263 |
| 5,943,500 A | * | 8/1999 | Maguire et al. ............ | 395/733 |
| 5,982,814 A | * | 11/1999 | Yeh et al. .................... | 375/222 |
| 6,065,089 A | * | 5/2000 | Hickerson et al. .......... | 710/266 |

OTHER PUBLICATIONS

Anonymous, Watch Dog Timer Interface, IBM Technical Disclosure Bulletin, vol. 30, No. 11, Apr. 1988, pp. 272–276, XP002093426, New York p. 273.

Anonymous, Hardware Support for an Operating System Timer, IBM Technical Disclosure Bulletin, vol. 34, No. 10B, Mar. 1992, pp. 237–238, XP000302701.

* cited by examiner

Primary Examiner—Thomas Lee
Assistant Examiner—Nitin C. Patel

(57) ABSTRACT

An interrupt management system includes a first down-counter which decrements in value in response to a clock signal to zero. When the value of the down-counter is equal to zero the down-counter is reset to a predetermined value X and an interrupt request signal is produced. The interrupt management system also includes a second down-counter which decrements in value from a predetermined value Y, where Y>X, in response to the clock signal.

The interrupt request signal is received by a processor which services the interrupt and generates an interrupt serviced signal. The interrupt serviced signal is received by a controller which also receive the value of the second down-counter.

Using the received value from the second down-counter, the controller can determine if an interrupt request has been missed and also determine the latency period for servicing an interrupt request.

8 Claims, 2 Drawing Sheets

INTERRUPT MANAGEMENT SYSTEM WITH TIMERS AND CONTROLLER ABLE TO DETECT THE INTERRUPT MISSED AND GENERATE APPROPRIATE WARNING SIGNAL FOR ERROR HANDLING

FIELD OF THE INVENTION

This invention relates to an interrupt management system for managing interrupts in a processor control system.

BACKGROUND OF THE INVENTION

Many real time processor controlled systems contain programmable down-counters which count down from a predetermined value and on reaching zero generate an interrupt request signal. The down-counter then resets to the original predetermined value and begins decrementing again.

This is typically used in real time processor controlled systems to generate interrupts at fixed periods, during which periods time dependent functions within the real time system are performed.

Although the programmable down-counters allow the interrupts to be accurately generated at each predetermined period, the time taken for those interrupts to be completed i.e. serviced, by the real time system or processor controlling the real time system, can vary greatly. In extreme cases this time delay may exceed the predetermined period of the down-counter, causing one or more subsequent interrupts to be missed by the system.

In order to maintain the reliability of the system, it is desirable to detect such extreme cases in order to allow error handling and to produce appropriate warnings. It is also desirable to know the actual time delay for an interrupt to be serviced.

SUMMARY OF THE INVENTION

The object of embodiments of the present invention is to provide an interrupt management system which is capable of providing the above outlined advantages and overcoming the identified problems of known interrupt systems, in particular so that it is possible to ascertain when an interrupt has been missed and the delay in servicing an interrupt According to the present invention there is provided an interrupt management system comprising:

a first timer having an input coupled to receive a clock signal and arranged to produce an interrupt request signal at the expiry of a predetermined time period;

a second timer having an input coupled to receive said clock signal and being arranged to hold a count value representing an interrupt service delay;

a processor arranged to receive said interrupt request signal and operable to generate an interrupt serviced signal when the corresponding interrupt has been serviced; and a controller arranged to receive said interrupt serviced signal from the processor and the count value from the second timer to determine whether an interrupt request has been missed.

According to the present invention there is also provided a method of managing interrupts comprising:

producing an interrupt request signal at the expiry of a predetermined time period in accordance with a system clock;

generating a count value representing an interrupt service delay from said system clock;

generating an interrupt serviced signal when the interrupt request has been serviced; and determining from the timing of the interrupt service signal and the count value whether an interrupt request has been missed.

A preferred embodiment of the present invention will now be described in further detail with reference to the following figures.

DESCRIPTION OF THE PREFERRED EMBODIMENT OF THE INVENTION

Figure 1:
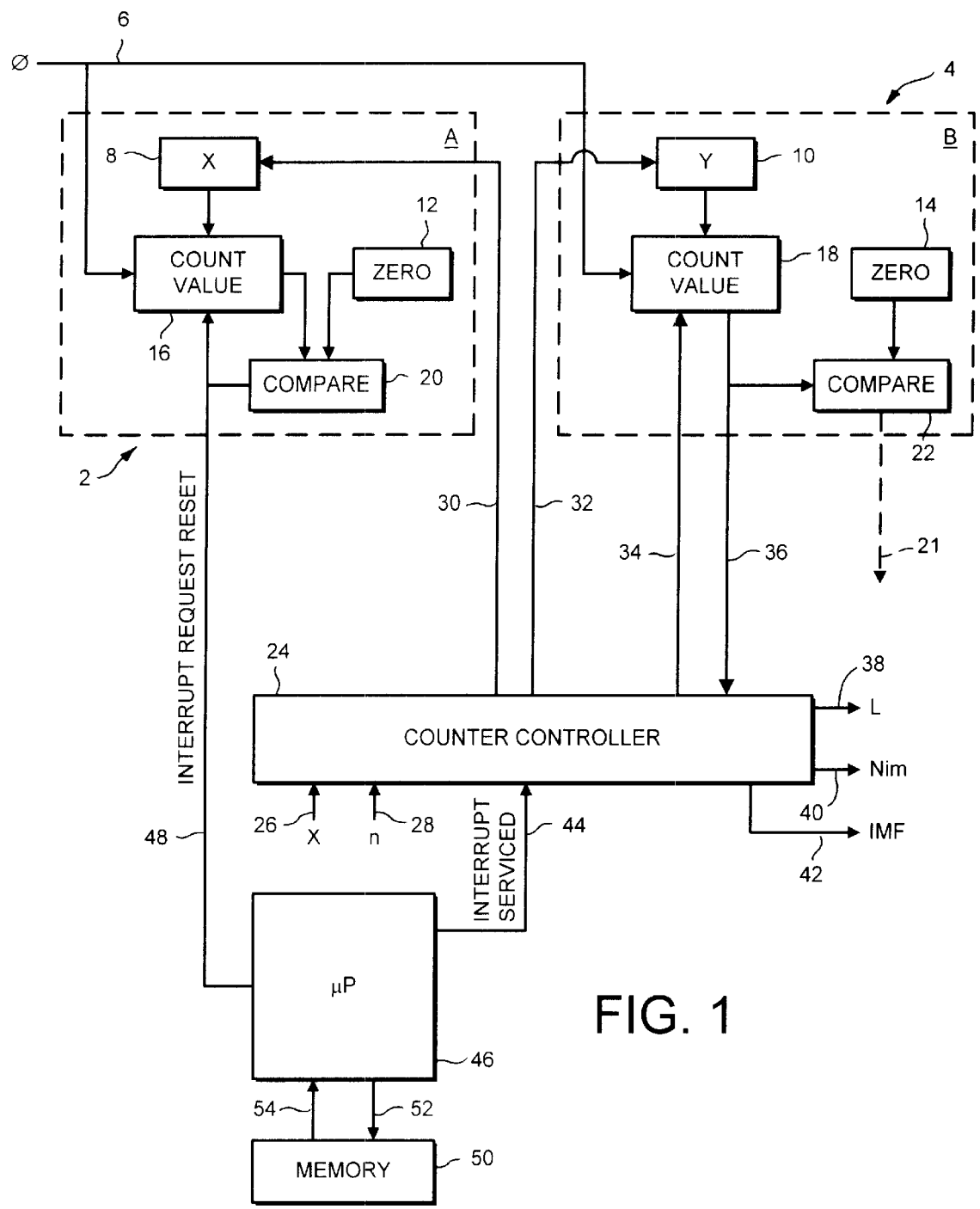
FIG. 1 shows a schematic representation of a preferred embodiment of the present invention.

FIG. 1 shows a schematic representation of an interrupt management system according to a preferred embodiment of the present invention. There are provided two down-counters, a first down-counter A, 2, a second down-counter B, 4, a system processor 46, a memory 50 and a down-counter controller 24. The counters are described herein with reference to schematic blocks which could be implemented in software or hardware. It will be appreciated that as a matter of practicality the down-counter and counter controller could be implemented by registers in conjunction with software routines executed by the processor 46 and held in the memory 50. The value of a count register 16 in the first down-counter A, is decremented upon receipt of each pulse of a clock signal 6. The clock signal 6 may be a system clock or any clock signal whose period is derived from the system clock. The current value in the count register 16 is output to a comparator 20. Also input into the comparator 20 is a zero signal provided from a target register 12. The comparator 20 compares the count value from count register 16 with the zero value held in target register 12 and when the count value equals zero, the comparator 20 produces an output signal 48. The output signal 48 has two functions. For the counter A it acts as a reset signal for the count register 16, resetting the count value to a predetermined value X, which is supplied from a reset register 8. The value X is loaded into the reset register 8 from the down-counter controller 24 via signal 30.

The value X is predetermined by a user and is programmed via programming line 26 into the down-counter controller 24. Therefore, the down-counter A, 2, continuously counts down from value X to zero and resets to value X on receipt of the output signal 48.

The output signal 48 is also input to the system processor 46 and acts as an interrupt request to trigger the system processor 46 to output a memory address 52 specifying the base location of an interrupt handling routine stored in memory block 50. The interrupt handling routine is output from the memory block via data line 54 to the system processor 46 whereupon the system processor proceeds to the interrupt functions determined by the interrupt handling routine. On completion of the interrupt handling routine the system processor 46 outputs an interrupt serviced signal 44 to the down-counter controller 24.

Like the first down-counter, the second down-counter, B, 4, is described in terms of schematic blocks comprising a count register 18, a target register 14, a reset register 10 and a comparator 22. The count register 18 holds a count value which it decrements on receipt of the same clock signal 6 as is received by the count register 16. The initial value from which count register 18 counts down from is provided by value Y stored in the reset register 10. Value Y=N*X, where N is an integer which is chosen such that the value Y is the highest value to which the count register 18 can be reset without causing it to overflow. Integer N is programmed via programming line 28 to the down-counter controller 24. Circuitry within the down-counter controller 24 multiplies N with X to produce value Y which is output via line 32 to reset register 10.

The comparator 22 compares the count value of the count register 18 and the zero value stored in target register 14 and, if the count value equals zero outputs a signal (shown by the chained line 21 in FIG. 1). As the operation of the interrupt management system is described in more detail hereinafter, it will be appreciated that the output signal from the comparator 22 is not normally produced.

When the system processor 46 has completed an interrupt handling routine and has output an interrupt serviced signal 44, the down-counter controller 24 reads the current value from the count register 18 as indicated by line 36. A number of calculations are performed by the down-counter controller 24 using the current count value from the register 18 and the values of X and N in order to establish if any further interrupt request signals output via line 48 have not been acted upon by the system processor 46 while the system processor was servicing a previously received interrupt request signal. If an interrupt has been missed by the microprocessor, the down-counter controller 24 is able to calculate the number of such missed interrupts and the time delay (latency) which was required by the system processor 46 to service the last received interrupt request. The down-counter controller 24 outputs an interrupt missed flag (IMF), as indicated by line 42, to an I/O interface (not shown) to produce a system output to alert a system operator as to whether or not an interrupt has been missed, a signal $N_{im}$ on line 40 indicating the number of missed interrupts and a latency signal L on signal line 38 indicating the delay required by the system processor 46 to service the interrupt. The operation of the down-counter controller 24 will be described in more detail with reference to FIG. 2.

When the down-counter controller 24 has performed all the calculations necessary to produce output signals L, $N_{im}$ and IMF, a counter register reset signal 34 is output to count register 18 in order to reset count register B.

Figure 2:
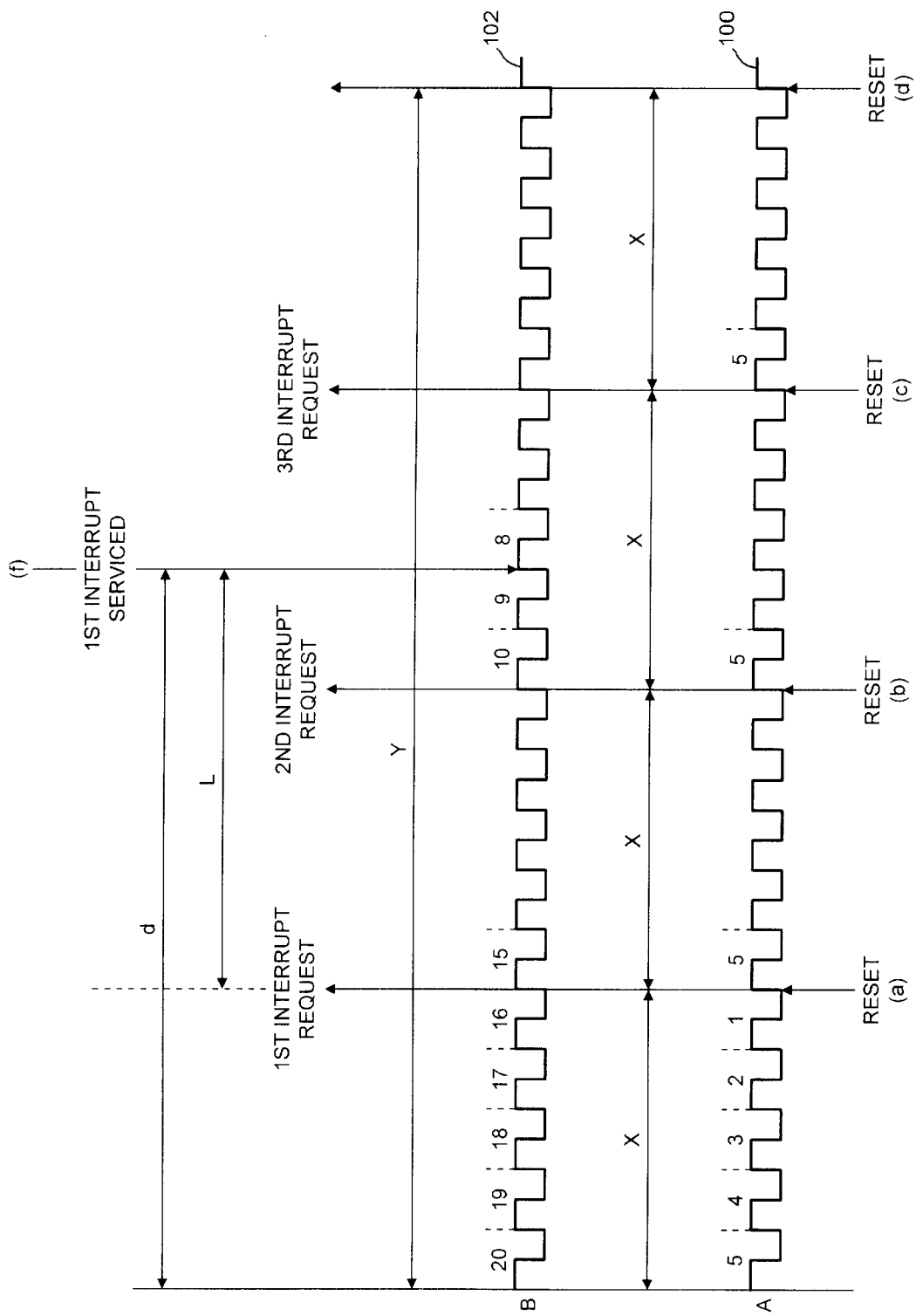
FIG. 2 shows a timing diagram for the embodiment of FIG. 1, illustrating the timing events which occur when an interrupt is missed.

A more detailed description of the operation of the down-counter controller 24 according to a preferred embodiment of the present invention will now be given with reference to FIG. 2. FIG. 2 is a timing diagram, showing a timing signal 100 representing counting by the count register 16 and a timing signal 102 representing counting by the count register 18. In FIG. 2, by way of example, X=5 and N=4. Therefore, Y=20. At point (a) the count register 16 has reached zero and therefore a first interrupt request signal has been generated simultaneously with a reset signal to reset the count register 16 to value X=5. At this point the value of the count register 18 has counted down to 15, as shown. It is possible that, before the first interrupt request has been serviced by the system processor 46, the count register 16 has once again reached zero, at point (b), whereupon a second interrupt request is produced and the count register 16 resets once again to value X. Shortly after the second interrupt request has been produced, the system processor 46 completes the first interrupt handling routine and generates a first interrupt serviced signal on signal line 44 which is input to the down-counter controller 24. This is illustrated in FIG. 2 at point (f). At this point the value of the count register 18 has decremented down to 8. This value is read from the count register 18 by the down-counter controller 24. The number of clock cycles which the down-counter B has decremented by is illustrated in FIG. 2 by the value d. Value d is calculated by subtracting the value of the count register 18 read by the down-counter controller 24 from the value Y. In this case d–12. Only if d is greater than or equal to 2X is it determined that an interrupt has been missed. This can be seen to be the case as provided that the first interrupt serviced signal 44 is received by the down-counter controller 24 before the second interrupt request is produced by the down-counter A, the system processor 46 is able to respond to the second interrupt request signal. In the example shown in FIG. 2, 2X=10 and therefore, as d=12, the down-counter controller 24 produces an interrupt missed flag 42, signifying that an interrupt request has been missed by the system processor 46, in this case the second interrupt request issued at point (b).

The time taken for the system processor 46 to service the first interrupt, the latency L, is calculated by the down-counter controller 24 using the expression:

$$L=[(N-1)*X]-v_b,$$

where $v_b$ is the value of count register B. Therefore, in this example, the latency L equals seven clock cycles. This is illustrated in FIG. 2 by the period between point (a) and point (f). This information is output by the down-counter controller 24 on signal line 38.

The total number of interrupts that have been missed, $N_{im}$ can be calculated according to the expression:

$$N_{im} = \frac{(N-1)*X}{(N*X)-L}$$

with the number of missed interrupts being equal to the largest integer value of that expression. In the example shown in FIG. 2 the above expression equals 1.2, therefore the number of missed interrupts $N_{im}$ equals 1, this being the second interrupt request at point (b). $N_{im}$ is output at signal line 40 by the down-counter controller 24.

On completing the above calculations, the down-counter controller 24 outputs a reset signal on signal line 34 to the counter register 18 to reset the count value. To allow for successive interrupts to be correctly identified and their latencies calculated it is desirable to reset both down-counters in synchronism. In the example described above this could be achieved by waiting to reset down-counter B until down-counter A is reset at point (c). However this would involve holding down-counter B idle for a period of three clock cycles, in which time further interrupt serviced signals may be received. In such a case the interrupt serviced signals would not be acted upon by down-counter B.

Therefore when the down-counter controller 24 has completed all the calculations of latencies etc., it uses the latency information to input a modified value of Y, denoted Y', to counter register 10. The value of Y' is derived by the expression Y'=Y–L. By altering the value of Y to Y', the effect is the same as resetting the down-counters in synchronism but down-counter B is not held idle at any time.

Value N is chosen such that value Y is the largest value which can be stored in the counter register 18 in order that under normal circumstances, the count register 18 never decrements to zero, thus ensuring that even if the latency of the system processor 46 is very long the latency and number of missed interrupts can still be calculated.

However, should a serious malfunction occur either within the interrupt management system, or in any other parts of the real time system which are controlled by the system processor 46 during the performance of the interrupt handling routine, such that no valid interrupt serviced signal 44 is output to the down-counter controller 24, the count register 18 within the second down-counter B will eventually reach zero. On reaching zero the comparator 22 will output a signal which is used to halt the operation of the whole system. The signal produced by the comparator 22 may also be used as a system error signal to indicate that a serious error has occurred.

What is claimed is:

1. An interrupt management system comprising:
   a first timer having an input coupled to receive a clock signal and arranged to produce an interrupt request signal at the expiry of a predetermined time period;
   a second timer having an input coupled to receive said clock signal and being arranged to hold a count value representing an interrupt service delay;
   a processor arranged to receive said interrupt request signal and operable to generate an interrupt serviced signal when the corresponding interrupt has been serviced; and
   a controller arranged to receive said interrupt serviced signal from the processor and the count value from the second timer to determine whether an interrupt request has been missed.

2. An interrupt management system according to claim 1, wherein the processor is operable to generate a warning signal if it is determined that an interrupt request has not been serviced.

3. An interrupt management system according to claim 1 or 2, wherein the controller is operable to determine a latency period for servicing an interrupt request.

4. An interrupt management system according to claim 1, wherein the controller is operable to determine the number of missed interrupt requests.

5. A method of managing interrupts comprising:
   producing an interrupt request signal at the expiry of a predetermined time period in accordance with a system clock;
   generating a count value representing an interrupt service delay from said system clock;
   generating an interrupt serviced signal when the interrupt request has been serviced; and
   determining from the timing of the interrupt serviced signal and the count value whether an interrupt request has been missed.

6. A method of managing interrupts according to claim 5, wherein the processor is operable to generate a warning signal if it is determined that an interrupt request has not been serviced.

7. A method of managing interrupts according to claim 5, wherein the controller is operable to determine a latency period for servicing an interrupt request.

8. A method of managing interrupts according to claim 5, wherein the controller is operable to determine the number of missed interrupt requests.

* * * * *